(12) United States Patent
Halverson

(10) Patent No.: US 6,970,185 B2
(45) Date of Patent: Nov. 29, 2005

(54) METHOD AND APPARATUS FOR ENHANCING DIGITAL IMAGES WITH TEXTUAL EXPLANATIONS

(75) Inventor: Paul Steven Halverson, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 889 days.

(21) Appl. No.: 09/774,731

(22) Filed: Jan. 31, 2001

(65) Prior Publication Data

US 2002/0101513 A1    Aug. 1, 2002

(51) Int. Cl.[7] .................... H04N 5/232; G10L 15/00
(52) U.S. Cl. ................ 348/207.1; 348/211.1; 348/375; 704/231; 704/275
(58) Field of Search .................. 348/207.1, 211.1, 348/211.4, 211.6, 231.3, 231.4, 375, 552, 348/515; 704/275, 251, 270, 254, 255, 257, 704/231

(56) References Cited

U.S. PATENT DOCUMENTS

| | | | | |
|---|---|---|---|---|
| 4,764,965 A | * | 8/1988 | Yoshimura et al. | 704/278 |
| 5,231,670 A | * | 7/1993 | Goldhor et al. | 704/275 |
| 5,477,511 A | * | 12/1995 | Englehardt | 369/25.01 |
| 5,572,728 A | * | 11/1996 | Tada et al. | 707/200 |
| 5,880,788 A | * | 3/1999 | Bregler | 348/515 |
| 5,995,936 A | * | 11/1999 | Brais et al. | 704/275 |
| 6,054,990 A | * | 4/2000 | Tran | 345/863 |
| 6,226,615 B1 | * | 5/2001 | Kirby et al. | 704/272 |
| 6,282,154 B1 | * | 8/2001 | Webb | 704/275 |
| 6,308,154 B1 | * | 10/2001 | Williams et al. | 704/254 |
| 2001/0037197 A1 | * | 11/2001 | Boulanov | 704/231 |

* cited by examiner

Primary Examiner—David L. Ometz
Assistant Examiner—Lin Ye
(74) Attorney, Agent, or Firm—Roy W. Truelson

(57) ABSTRACT

A photographer adds explanatory text to a captured image by speaking the text at approximately the time the image is captured by the digital camera. The spoken information is reduced to text by recognizing the user's speech, and is associated with the digital image. Preferably, the digital camera contains an on-board speech reduction capability to produce an intermediate symbolic form expressing the user's speech as a series of basic sounds, or phonemes, which can be later reduced to natural language text by a computer system having access to sophisticated vocabulary lists and syntactical analysis.

15 Claims, 5 Drawing Sheets

METHOD AND APPARATUS FOR ENHANCING DIGITAL IMAGES WITH TEXTUAL EXPLANATIONS

FIELD OF THE INVENTION

The present invention relates to digital data devices, and in particular to digital cameras, motion video, and similar devices which digitally capture optical images.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The declining prices and expanding capabilities of modern digital technology has caused it to be used in an ever increasing variety of applications. One of these applications has been the capturing of optical images. Optical imaging technology generally uses a digital sensor array, such as a charge-coupled device (CCD) array, having a large number of photo-sensitive elements arranged in a regular pattern, and appropriate supporting hardware which scans the output of the elements and constructs therefrom a digital image. The digital image can then be stored in any digital data storage medium, displayed on a digital display device, printed on paper or other medium, manipulated using editing tools, or transmitted to remote locations using any transmission medium appropriate for digital data.

Optical imaging has been used in a variety of settings, including fax machines, document scanners, bar code readers, and so forth. In particular, digital optical imaging is also used as a substitute for older film-based media in high-resolution still and motion picture cameras. Indeed, as digital optical technology improves in quality and declines in price, many foresee the day when it will completely supplant the older film-based media in these fields.

A digital camera, whether still or motion video, typically contains an on-board processor, which can be programmed to perform a variety of functions. Among other things, the processor can be programmed to embed supplementary information in the digital image. It is known, for example, to embed a date and time at which the image was captured. Date and time is easily established by maintaining an on-board digital clock in the camera. Embedding such supplementary information is not particularly difficult once it is obtained.

Most digital cameras to date have simply tried to mimic the capabilities of their mechanical device counterparts, making limited use of digital technologies other than simple optical scanning and recording. Such an approach fails to recognize the vast potential of the information age to provide improved integration of digital technology and enhanced function of digital cameras not yet conceived, a potential which is bounded only by human imagination. In particular, it fails to recognize the potential to obtain information, which can then be embedded in or otherwise associated with a digital image.

SUMMARY OF THE INVENTION

A user of a digital camera apparatus (photographer) adds explanatory text to a captured image by speaking the text at approximately the time the image is captured by the digital camera apparatus. The spoken information is reduced to text by recognizing the user's speech, and is associated with the digital image.

In the preferred embodiment, a digital camera apparatus contains an on-board speech reduction capability to recognize and reduce to symbolic form auxiliary information spoken by the user. This capability is preferably in the form of speech reduction software executed on a general purpose digital processor, the processor also being used to perform various control functions for operation of the camera. Speech need not be reduced to symbolic form text in real time. Speech is sensed using a built-in microphone, converted to digital samples, and stored temporarily in an on-board storage. The processor then converts the stored speech samples to symbolic form in the background, when it is not performing other camera tasks. Once the speech sample is converted to symbolic form, the storage area used for the speech sample can be reused. The storage required for storing a small amount of symbols is relatively small compared to speech or optical images.

The symbolic form rendered by the camera may be natural language text, but is preferably an intermediate symbolic form expressing the user's speech as a series of basic sounds, or phonemes, which can be later reduced to natural language text by a computer system having access to sophisticated vocabulary lists and syntactical analysis.

Preferably, the explanatory text spoken by the photographer is free-form captioning information. I.e., there are no restrictions on the format of the spoken text other than that it be in a recognized human language. It would alternatively be possible to require the user to speak certain information in a pre-determined order, as by prompting the user with an audible or visible message for specified information. E.g., the camera may prompt the user for a title, photographer name, location, and so forth, which may or may not be followed by a freeform explanatory text. The information spoken by the user may be supplemented by information available to the camera's processor without user intervention, such as a date and time, camera settings, etc.

A method and apparatus described herein provides an enhanced record supplementing its recorded digital images, which is easily generated by the user.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
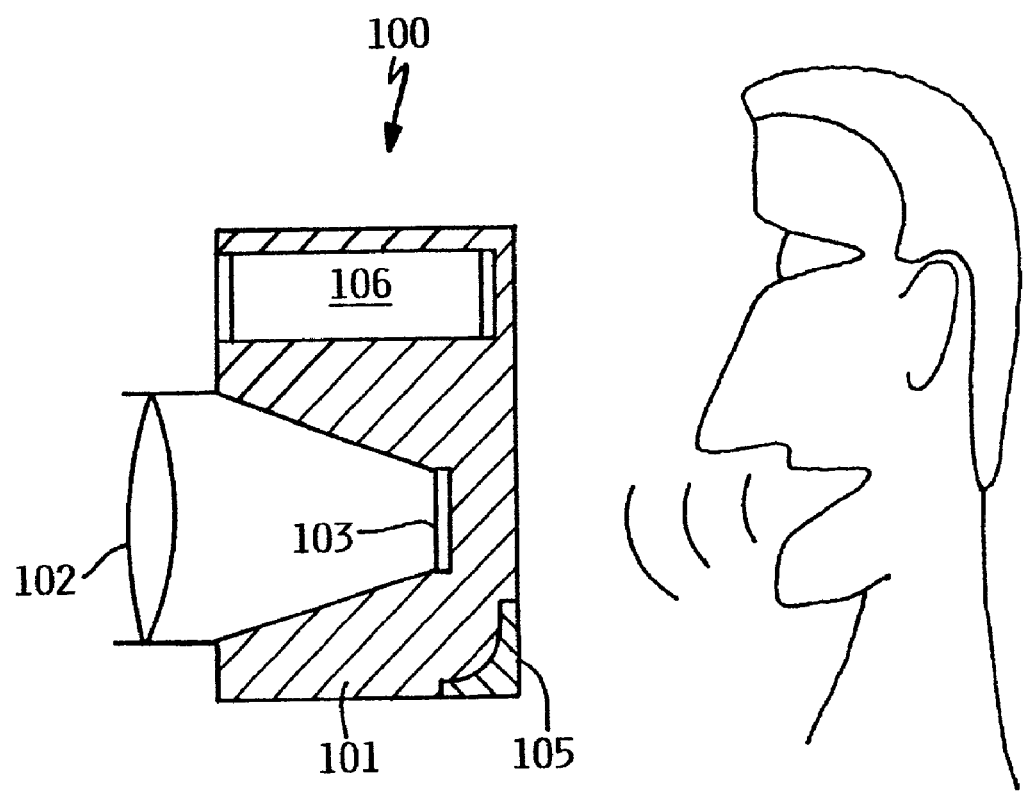
FIG. 1 is a high-level sectional view representing the major components of a digital camera according to the preferred embodiment of the present invention.

FIG. 1 is a high-level sectional view of a digital camera according to the preferred embodiment. Camera 100 includes a body or housing 101, lens 102, and optical sensor array 103. A viewing channel 106 is shown in FIG. 1 for allowing the user to view the object to be photographed (object of interest), having transparent windows at either end and allowing light to pass through the camera. However, it would alternatively be possible to view the object of interest through lens 102 by using a well-known single lens reflex (SLR) mechanism, or to project a digital image sensed by sensor 103 using a small display, such as a liquid crystal diode (LCD) display.

A small microphone 105 is mounted on camera body 101. Preferably, microphone 105 is mounted near an edge of camera body 101, specifically, the edge formed by the intersection of the camera bottom and camera side opposite lens 102. This orientation places microphone 105 in a position near the photographer's mouth as the photographer is photographing an object of interest, and is therefore an advantageous position from which to capture words spoken by the photographer. Microphone 105 may be a directional microphone which filters out sound coming from directions other than the photographer's mouth.

It will be understood that the representation in FIG. 1 is intended as a high-level representation for illustrative purposes, and is not intended as a detailed drawing of all the components of a camera. Additionally, the components which are shown are represented in simplified form for ease of understanding. E.g., lens 102 is often implemented as a multi-piece element having movable parts for adjusting the focal length.

Figure 2:
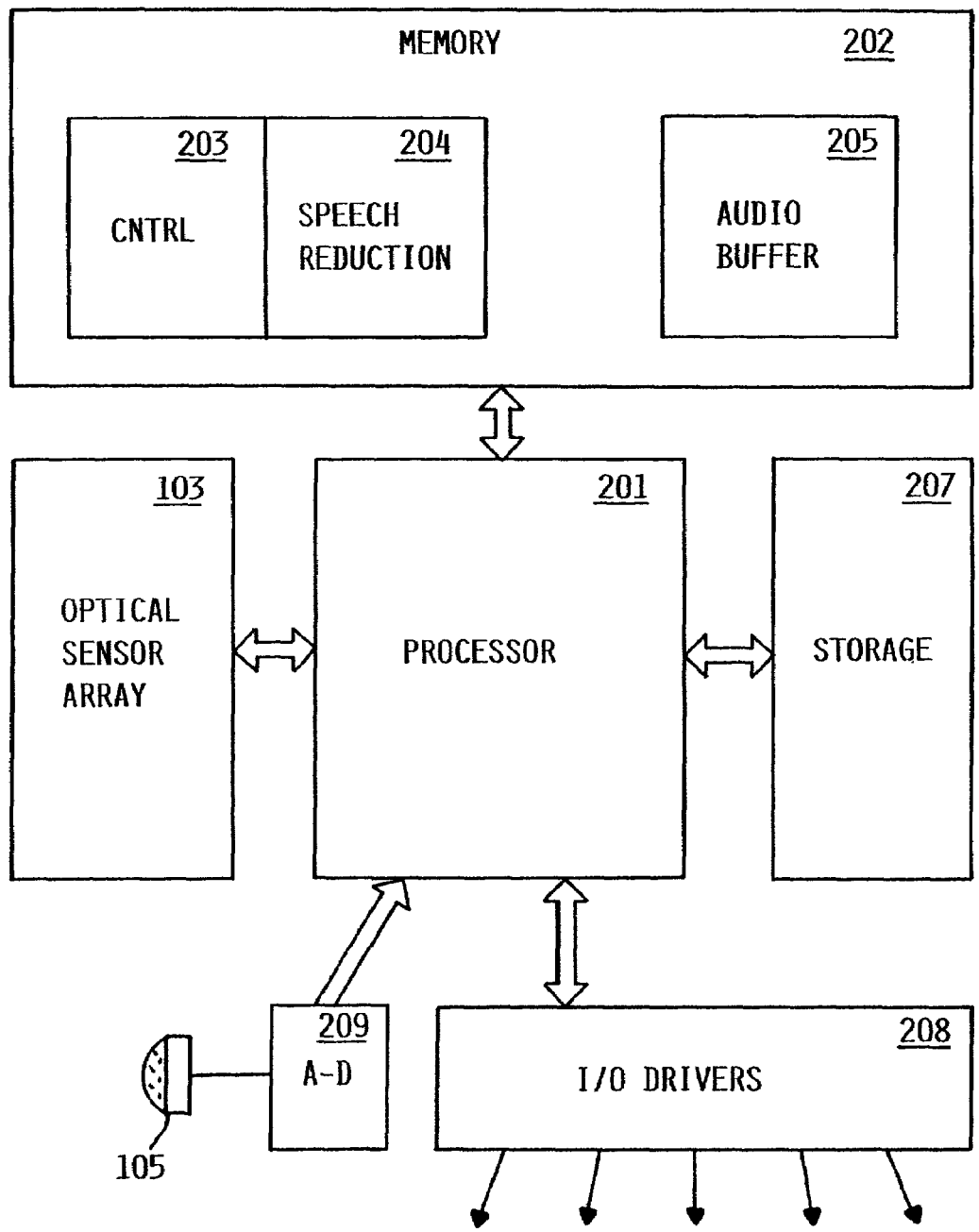
FIG. 2 is a illustrates the major electronic components of a digital camera, according to the preferred embodiment.

FIG. 2 is a high-level diagram illustrating the major electronic components of a digital camera, according to the preferred embodiment. The camera includes a programmable processor 201 in communication with a random access memory 202. Memory 202 contains a control program 203 comprising a plurality of processor executable instructions which, when executed on processor 201, control the operation of the camera. Memory further contains a speech reduction program 204, as explained further herein. The camera further includes a data storage device 207 for storing digital images captured by the camera along with segments of symbolic text, each segment associated with a respective image; optical sensor array 103 for capturing digital images; and I/O device driver/controller 208 for communicating with various components of the camera, all of which are under the control of processor 201. The camera further includes an analog-to-digital converter 209 in communication with microphone 105, for converting an audio signal received by microphone 205 into a digitized signal form, i.e., a plurality of sequential digital samples. Data storage device 207 may be any appropriate storage device used for storing digital images, such as semiconductor memory, magnetic tape, magnetic disk, optical memory, etc. The storage media may or may not be removable. I/O device driver controller 208 provides an interface to other camera components. These components include those controlled by processor 201, such as shutter, lens, mirrors, etc, as well as those from which processor 201 receives input, such as a shutter actuator button, or other user accessible buttons and switches. For some embodiments, these components may include a digital display device for displaying images to a user. Preferably, there is also a small status display, such as an LCD display, for displaying numbers, text and icons to inform the use of camera status. Additionally, there will usually be at least one external port for transmitting data to a device external to the camera, such as a computer, a television, a printer, etc. Power to the various electronic components is supplied by a battery (not shown).

Memory 202 preferably includes a portion which is strictly non-volatile, i.e., the data in the non-volatile portion is not lost in the event the memory receives no power, whether due to battery failure, replacement, or other event. Control program 203 and speech reduction program 204 are preferably stored in this portion of memory. Memory 202 also preferably includes a volatile or dynamic portion for storing temporary values, counters, etc., or for buffering image data. Audio buffer 205 is contained in the dynamic portion of memory. Audio buffer 205 temporarily stores digitized speech (sequential digital samples of the audio signal) pending reduction to symbolic text by speech recognition program 204. Audio buffer may be of variable size to accommodate temporary need. Additionally, depending on the capabilities of storage 207, digitized speech samples may be buffered in storage 207, so that only a very small number samples being analyzed need be buffered in memory 202.

As is understood in the art of automated speech recognition, the process of producing natural human language text from spoken words typically involves multiple steps. The audio signal generated by a human voice is first reduced to digital samples, and analyzed for frequency patterns. An attempt is made to match these to fundamental sound units of human speech, called phonemes. Because of the variability in speech patterns, not only among different speakers but when the same words are spoken by a single speaker, including the fact that a person may slur certain words or sounds, this analysis can not render the speaker's intended phonemes with perfect accuracy. Vowel sounds tend to be easier for an automated system to recognize than consonants, but mistakes can be made in either. More typically, the analysis will produce guesses about the speaker's intended phonemes, which may be associated with probabilities that the guesses are correct. A typical speech recognition system will then attempt to match the string of phonemes with known words from a dictionary. In doing so, it will not necessarily choose the phoneme having the highest probability in every instance. A phoneme having a lower probability may be chosen if the higher probability phoneme does not produce a recognizable word. Even in this case, the system may only be able to guess at words, thus associating another probability with each word of multiple alternative word formulations. Finally, a very sophisticated speech recognition program will carry the analysis one step further to analyze the syntax of an entire sentence, and thus choose the most likely set of words from among multiple possibilities.

Speech reduction program 204 can take any of various forms. It may be a full-function speech recognition program for converting audio input into a stream of text in a natural human language, performing all the steps outlined above. However, it will be understood that such programs may consume large amounts of memory, increasing the cost of the camera. Therefore, speech reduction program 204 is more preferably only a portion of a full-function speech recognition program. Specifically, program 204 may be a front-end which processes audio samples into a symbolic representation of a series of basic sounds, or phonemes, corresponding to the parts of human speech, without performing vocabulary or syntactical analysis. This symbolic representation could include probability factors associated with alternative phonemes, where the system is uncertain which phoneme was intended by the speaker. This symbolic form is intended to be reduced to natural language text at a later time by a computer system having access to a large dictionary and sophisticated syntactical analysis. It will be noted that such a computer system need not perform speech recognition in real time. It will further be noted that another advantage of such off-line analysis is that the speech recognition front-end within the camera may be multi-lingual, merely rendering speech into phonemes, which are later transcribed to text by a program specific to the natural language of the user.

Figure 3:
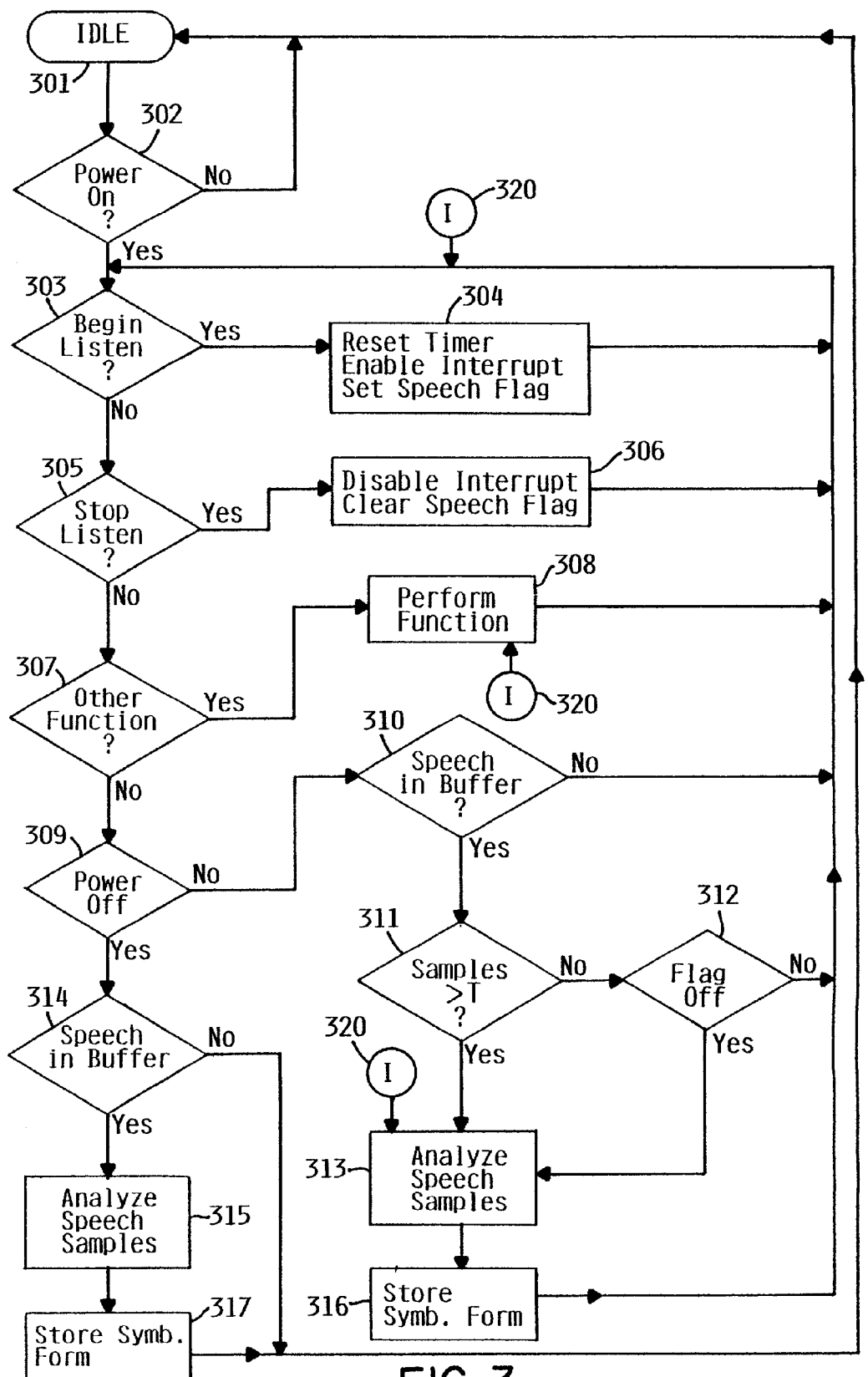
FIG. 3 is a flowchart showing the operation of a camera control program at a high level, according to the preferred embodiment.

FIG. 3 is a flowchart showing the operation at a high level of control program 203 in conjunction with speech reduction program 204 of a camera according to the preferred embodiment. The camera is initially in an idle state 301. In the idle state, the control program periodically polls for a power-on indication, such as the user touching an appropriate button or opening a lens cover (step 302). When a power-on indication is detected, control program 204 enters an operational loop, wherein it waits for the user to indicate any of various functions which the camera may perform. If the program detects a begin listening indication (step 303), this indicates that the camera is to begin recording speech spoken by the user, and ultimately reduce the speech to symbolic form as described herein. An indication is preferably provided by the user pressing and holding an electrical switch in the form of a button (not shown) mounted on the body of the camera. However, the "begin listening" indication could be provided in a variety of alternative ways. For example, the camera could begin listening upon a sequence of function buttons being activated; or could automatically begin listening upon detecting sound coming from the general direction of the user's mouth through directional microphone 105; or could automatically begin listening when a lens cover is opened; or other alternatives. The use of a dedicated button switch, while adding a small amount of cost and weight to the camera, is preferred because it is less confusing to the user, and less likely to record undesirable matter. If the control program detects a begin listening indication, it resets a sampling timer, enables a sampling timer interrupt, and sets a speech recording flag (step 304).

The sampling timer is used to trigger the collection of an audio sample from analog-to-digital converter 209. The timer is set to an appropriate sampling rate for human speech. E.g., a sampling rate of 20 KHz to 50 KHz is typically sufficient. When the timer times out and the sampling timer interrupt is enabled, the processor interrupts whatever task it is performing and stores a single audio sample in buffer 205, resets the timer, and returns to the previously executing task. This interrupt may occur at any of various points in control program execution, as indicated by the letter "I" within a circle 320 in FIG. 3.

If the control program detects a stop listening indication (step 305), it disables the sampling timer interrupt and clears the speech recording flag (step 306). In the preferred embodiment, a stop listening indication means that the user releases the button. However, this indication could be provided by other means, as noted above.

If the control program detects that some other function is activated by the user (step 307), it performs the appropriate function (step 308). Such a function could be to capture an image (take a still photograph or motion video), but could be many other things as well. Some functions may relate to preparation for the capture of a particular image, such as setting the aperture, focus, etc., while other functions may relate to matters unrelated to a particular image, such as setting a date/time indicator, uploading a collection of images in storage, etc.

If the user does not request any function, the "N" branch is taken from step 307. In this case, if the user is not shutting power off, the "N" branch is taken from step 309, and the control program determines whether any audio samples from the user's speech input are stored in the buffer (step 310). If so, the program determines whether the number of samples is greater than some threshold for beginning analysis (step 311). If so, the "Y" branch is taken from step 311, and speech reduction program 204 is invoked to reduce at least some of the samples in the buffer to symbolic form (step 313). If the threshold is not met (the "N" branch from step 311), but the speech flag is off (step 312), the speech reduction program is also invoked (step 313). In this latter case, the user has finished speaking, and the samples should therefore be reduced to symbolic form no matter how small the sample input. After reduction to symbolic form, the symbolic form is stored in mass storage 207 in a relationship associated with the current digital image (step 316).

If, at step 309, the control program determines that the user has performed a power off operation, the "Y" branch is taken from step 309. If any speech samples remain in the buffer at this point, the "Y" branch is taken from step 314, and the samples are analyzed by speech reduction program 204 to convert them to symbolic form (step 315), and the symbolic form is stored in storage 207, associated with the current digital image (step 317). In any case, the control program then returns to idle state 301.

In performing either step 316 or 317, the control program associates the symbolic speech with a particular digital image in storage 207. The image with which the symbolic form is associated is an image captured substantially contemporaneously with the recording of the spoken speech. It is possible that the image will actually be captured during the period that the photographer is speaking, but it is more likely that the speech will be captured shortly before or shortly after capture of the digital image. There are any number of ways the camera may associate a particular speech segment with a digital image. Normally, it is assumed that a photographer is more likely to dictate the caption immediately after capturing the photograph, than immediately before. Therefore, in the preferred embodiment, the camera associates a speech segment according to the following priorities:

1. If a digital image is captured during the recording of a speech segment, the speech is associated with that digital image;
2. If no digital image was captured from the time the camera was powered on until the end of recording the speech segment, and a digital image was captured after recording the speech segment but before the camera was powered off (i.e., during the same power-on session), then the speech segment is associated with the digital image captured immediately after recording the speech segment; and
3. In all other cases, the speech segment is associated with the digital image captured immediately preceding recording of the speech segment.

It will be understood, however, that there are alternative means for associating a digital image with a speech segment.

E.g., the user could be required to specify with one or more function buttons the number of the digital image.

As used herein, "associate" means that there is some recorded relationship in storage 207 by which it is possible to determine that a particular speech segment describes a particular digital image. In a simple form, this could be nothing more than a common record, in which one field contains the digital image while another contains the symbolic form of the speech segment, or alternatively, a pointer within the symbolic speech segment to a storage location containing the digital image, or an image number recorded with the speech segment.

Figure 4:
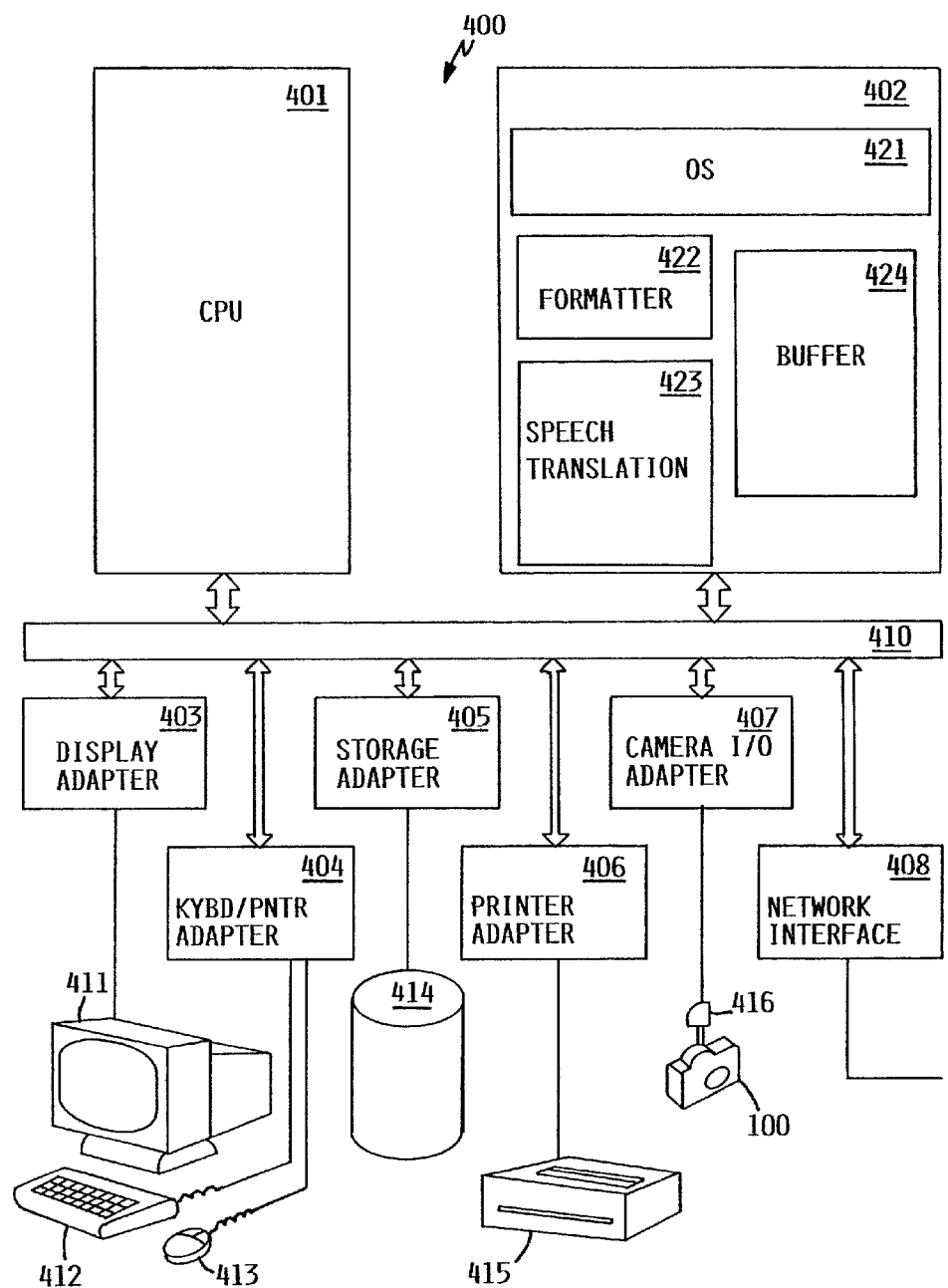
FIG. 4 illustrates the major components of a computer system for rendering the digital image with the speech segment, according to the preferred embodiment.

When digital data in storage 207 is transferred to a computer system or other output apparatus for generating image output, the speech segment is identified with the digital photograph and rendered to the user in an appropriate form. FIG. 4 illustrates the major components of a computer system for rendering the digital image with the speech segment, while FIG. 5 is a high-level flowchart of the steps involved in capturing and rendering images with explanatory text, according to the preferred embodiment.

As shown in FIG. 4, computer system 400 includes CPU 401, main memory 402, various device adapters and interfaces 403–408, and communications bus 410. CPU 401 is a general-purpose programmable processor, executing instructions stored in memory 402; while a single CPU is shown in FIG. 4, it should be understood that computer systems having multiple CPUs could be used. Memory 402 is a random-access semiconductor memory for storing data and programs; memory is shown conceptually as a single monolithic entity, it being understood that memory is often arranged in a hierarchy of caches and other memory devices. Communications bus 410 supports transfer of data, commands and other information between different devices; while shown in simplified form as a single bus, it may be structured as multiple buses, and may be arranged in a hierarchical form. Display adapter 403 supports video display 411, which is typically a cathode-ray tube display, although other display technologies may be used. Keyboard/pointer adapter 404 supports keyboard 412 and pointing device 413, depicted as a mouse, it being understood that other forms of input devices could be used. Storage adapter 405 supports one or more data storage devices 414, which are typically rotating magnetic hard disk drives, although other data storage devices could be used. Printer adapter 406 supports printer 415. I/O adapter 407 supports special I/O port 416 for communicating with camera 100. Network interface 408 provides a physical interface to a network of computer systems; for example, network interface 408 may be a modem for connecting to a telephone system, which is used for accessing the Internet, it being understood that other types of interface are possible. For example, the interface may be a mainframe terminal channel interface, such as might be used to connect multiple workstations to a single larger mainframe computer acting as a server, or a local area network. Computer system 400 will typically be any of various models of single-user computer systems known as "personal computers". The representation of FIG. 4 is intended as an exemplary simplified representation, it being understood that many variations in system configuration are possible in addition to those mentioned here. Furthermore, an apparatus for receiving and rendering digital camera images in accordance with the present invention need not be a personal computer system, and may be a so-called dumb terminal attached to a mainframe, a notebook or laptop computer, a special-purpose device whose sole purpose is to print images, or any of various hardware variations.

As shown in FIG. 4, memory 402 conceptually includes an operating system 421, digital image formatting program 422, speech translation program 423, and buffer 424. Operating system 421 provides various low-level software functions, such as device interfaces, management of memory pages, management of windowing interfaces, management of multiple tasks, etc. as is well-known in the art. Operating system 421 my be, e.g., a Microsoft Windows NT™ operating system, it being understood that other operating systems could be used.

Figure 5:
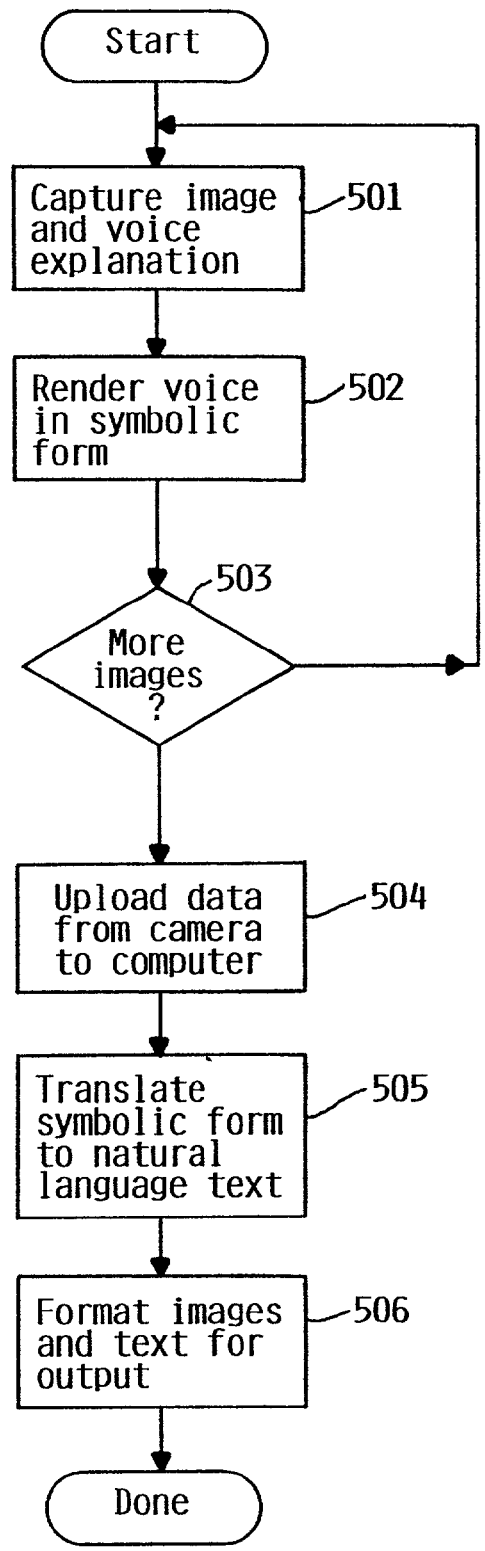
FIG. 5 is a high-level flowchart of the steps involved in capturing and rendering images with explanatory text, according to the preferred embodiment.

FIG. 5 represents at a high level to overall process of capturing images with text in the camera, and subsequently reducing images with text. As shown in FIG. 5, an image is captured along with the user's spoken explanation (step 501), and the user's voice is then rendered in a symbolic form (step 502); these steps were described in greater detail earlier and illustrated in FIG. 3. If the user wishes to capture additional images (step 503), the process repeats until the user is ready to upload the data from the camera to a computer or other output apparatus.

When the user is ready, the data (images and symbolic form of explanations) is uploaded from camera 100 to computer system 400 (step 504). Digital image formatting program 422 receives digital image data through camera interface 416 and temporarily stores it in buffer 424

Digital image formatting program 422 calls speech translation program 423 to translate the intermediate symbolic form of speech uploaded from camera 100 into text in a specific natural language of the user (step 505). It will be understood that if camera 100 contains a complete speech recognition apparatus which reduces human speech to natural language text, speech translation program 423 is unnecessary. However, as explained above, in many embodiments it may be preferable to perform sophisticated vocabulary and syntactical analysis in a computer system separate from camera 100, a step which is performed by translation program 423. Thus, translation program 423 may contain a large vocabulary list and set of rules for syntactical analysis.

Image Formatting program 422 formats the images in an appropriate form for viewing (step 506). Formatting program 422 may optionally contain editing capability, allowing the user to edit digital images, as by cropping, enlarging/reducing, red-eye reduction, or other editing functions. After any optional editing is performed, the image is formatted along with explanatory translated text for the appropriate output type. E.g., if a digital photograph is to be printed on paper using printer 415, a caption may be printed using the translated speech segment in the margin of the photograph, or may be superimposed on the photograph itself, or may be printed on the back of the photograph. Alternatively, a separate sheet of captioning text may be printed having identifying numbers associating each caption with a photograph. Alternatively, the digital data may be kept in on-line form, in which the image is viewed from a computer screen, and the explanatory text is displayed along an edge of the image, or is available to the user by selecting an appropriate function. Formatted images and translated text are typically stored in storage 414.

It will be appreciated that explanatory text associated with a digital image may be used for purposes other than simple display. For example, the text may be imported into an on-line database of photographic explanations, which can be searched using key words or any of various known searching techniques.

While a certain number of applications and other entities are shown in memory 402, it will be understood that these are shown for purposes of illustration only, and that the actual number of such entities may vary. Additionally, while the software components of FIG. 4 are shown conceptually as residing in memory 402, it will be understood that in general the memory of a computer system will be too small to hold all programs and data simultaneously, and that information is typically stored in data storage 414, comprising one or more mass storage devices such as rotating magnetic disk drives, and that the information is paged into memory by the operating system as required.

In general, the routines executed to implement the illustrated embodiments of the invention, whether implemented within camera 100 or computer system 400 as part of an operating system or a specific application, program, object, module or sequence of instructions are referred to herein as "programs" or "computer programs". The computer programs typically comprise instructions which, when read and executed by one or more processors in the devices or systems consistent with the invention, cause those devices or systems to perform the steps necessary to execute steps or generate elements embodying the various aspects of the present invention. Moreover, while the invention has and hereinafter will be described in the context of fully functioning camera apparatus or computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and nonvolatile memory devices, floppy disks, hard-disk drives, CD-ROM's, DVD'S, magnetic tape, and transmission-type media such as digital and analog communications links, including wireless communications links. Examples of signal-bearing media is illustrated in FIG. 2 as memory 202, and in FIG. 4 as memory 402 or data storage device 414.

In the description above, various terminology and drawings have been used to imply that a camera according to the present invention takes still photographs. The present invention is generally applicable to motion video as well as still, and nothing herein should be interpreted as limited to still photographs unless expressly so stated. Furthermore, the present invention could apply to any of various digital cameras which have the capability to take both still and motion video.

Although a specific embodiment of the invention has been disclosed along with certain alternatives, it will be recognized by those skilled in the art that additional variations in form and detail may be made within the scope of the following claims:

What is claimed is:

1. A digital camera, comprising:
   a housing;
   a digital optical sensing apparatus mounted within said housing, said digital optical sensing apparatus sensing optical images;
   a storage medium for storing digital optical images captured by said digital optical sensing apparatus;
   an acoustic sensor capable of sensing human speech;
   a speech reduction apparatus coupled to said acoustic sensor, said speech reduction apparatus converting human speech sensed by said acoustic sensor to a symbolic text form; and
   a controller which stores said symbolic text form in said storage medium in a relationship associated with a captured digital image, wherein said controller:
   (a) receives a user indication of a plurality of discrete time intervals;
   (b) records a plurality of discrete human speech segments sensed by said acoustic sensor in respective said discrete time intervals;
   (c) causes said speech reduction apparatus to convert each said human speech segment to a corresponding symbolic text segment; and
   (d) automatically associates a respective digital optical image captured by said digital optical sensing apparatus with each said symbolic text segment based on a temporal relationship between the time interval in which the discrete human speech segment corresponding to the symbolic text segment was recorded and the capturing of said digital optical image;
   wherein said controller associates a respective digital image with each symbolic text segment according to all of the following association priorities:
   (1) if a first digital image is captured during the recording of a human speech segment corresponding to the symbolic text segment, the symbolic text segment is associated with the first digital image;
   (2) if no digital image is captured from a time the digital camera is powered on until the end of the recoding of the human speech segment corresponding to the symbolic text segment, and a second digital image is captured after recording the human speech segment but before the digital camera is powered off, then the symbolic text segment is associated with the second digital image; and
   (3) in all other cases, the symbolic text is associated with the digital image most recently captured before the recording of the human speech segment corresponding to the symbolic text segment.

2. The digital camera of claim 1, wherein said controller comprises a programmable processor executing a control program for controlling the operation of said digital camera.

3. The digital camera of claim 2, wherein said speech reduction apparatus comprises a speech reduction algorithm embodied as a plurality of instructions executable on said programmable processor.

4. The digital camera of claim 1, wherein said speech reduction apparatus converts said human speech sensed by said acoustic sensor to an intermediate symbolic form comprising a symbolic representation of phonemes, said intermediate symbolic form being subsequently reduced to natural language text by a separate apparatus.

5. A method of operating a digital camera, comprising the steps of:
   capturing a plurality of digital images of respective objects of interest with optical sensing apparatus of said digital camera;
   recording a plurality of discrete segments of human speech of a user in said digital camera during a plurality of respective discrete time intervals, each respective discrete time interval occurring substantially contemporaneously with capturing of each respective digital image of said plurality of digital images;
   rendering each said segment of said plurality of discrete segments of human speech in a respective corresponding segment of symbolic text using speech reduction apparatus within said digital camera; and
   automatically associating each respective digital image of said plurality of digital images with a respective corresponding segment of symbolic text rendered from a respective corresponding segment of human speech based on a temporal relationship between the respective discrete time interval during which the corresponding segment of human speed was recorded and the capturing of the respective digital image, and storing each said symbolic text segment in a relationship associated with each respective said captured digital image;

wherein said step of automatically associating each respective digital image of said plurality of digital images with a respective corresponding segment of symbolic text comprises automatically associating according to all of the following association priorities:

(1) if a first digital image is captured during the recording of a human speech segment corresponding to the symbolic text segment, the symbolic text segment is associated with the first digital image;

(2) if no digital image is captured from a time the digital camera is powered on until the end of the recoding of the human speech segment corresponding to the symbolic text segment, and a second digital image is captured after recording the human speech segment but before the digital camera is powered off, then the symbolic text segment is associated with the second digital image; and (3) in all other cases, the symbolic text is associated with the digital image most recently captured before the recording of the human speech segment corresponding to the symbolic text segment.

6. The method of operating a digital camera of claim 5, wherein said step of rendering each said segment of said plurality of discrete segments of human speech in a respective corresponding segment of symbolic text converts said human speech to an intermediate symbolic form comprising a symbolic representation of phonemes, said intermediate symbolic form being subsequently reduced to natural language text by an apparatus separate from said digital camera.

7. The method of operating a digital camera of claim 5, wherein said step of rendering each said segment of said plurality of discrete segments of human speech in a respective corresponding segment of symbolic text is performed by a programmable processor executing a speech reduction program.

8. The method of operating a digital camera of claim 7, wherein said programmable processor further executes a control program for controlling the operation of said digital camera, and said step of rendering each said segment of said plurality of discrete segments of human speech in a respective corresponding segment of symbolic text is performed by said programmable processor in the background when said control program is otherwise unoccupied.

9. A program product for controlling the operation of a digital camera, said program product comprising a plurality of processor executable instructions recorded on signal-bearing media, wherein said instructions, when executed by at least one programmable processor within said digital camera, cause the camera to perform the steps of:

capturing a plurality of digital images of respective objects of interest with optical sensing apparatus of said digital camera;

recording a plurality of discrete segments of human speech of a user in said digital camera during a plurality of respective discrete time intervals, each respective discrete time interval occurring substantially contemporaneously with capturing of each respective digital image of said plurality of digital images;

rendering each said segment of said plurality of discrete segments of human speech in a respective corresponding segment of symbolic text using speech reduction apparatus within said digital camera; and associating each respective digital image of said plurality of digital images with a respective corresponding segment of symbolic text rendered from a respective corresponding segment of human speech based on a temporal relationship between the respective discrete time interval during which the corresponding segment of human speech was recorded and the capturing of the respective digital image, and storing each said symbolic text segment in a relationship associated with each respective said captured digital image;

wherein said step of associating each respective digital image of said plurality of digital images with a respective corresponding segment of symbolic text comprises associating according to all of the following priorities:

(1) if a first digital image is captured during the recording of a human speech segment corresponding to the symbolic text segment, the symbolic text segment is associated with the first digital image;

(2) if no digital image is captured from a time the digital camera is powered on until the end of the recoding of the human speech segment corresponding to the symbolic text segment, and a second digital image is captured after recording the human speech segment but before the digital camera is powered off, then the symbolic text segment is associated with the second digital image; and (3) in all other cases, the symbolic text is associated with the digital image most recently captured before the recording of the human speech segment corresponding to the symbolic text segment.

10. The program product for controlling the operation of a digital camera of claim 9, wherein said step of rendering each said segment of said plurality of discrete segments of human speech in a respective corresponding segment of symbolic text converts said human speech to an intermediate symbolic form comprising a symbolic representation of phonemes, said intermediate symbolic form being subsequently reduced to natural language text by an apparatus separate from said digital camera.

11. A method of recording information with digital images, comprising the steps of:

capturing a plurality of digital images of respective objects of interest with optical sensing apparatus of a digital camera;

recording a plurality of discrete segments of human speech of a user in said digital camera during a plurality of respective discrete time intervals occurring substantially contemporaneously with capturing of each respective digital image of said plurality of digital images;

rendering each said segment of said plurality of discrete segments of human speech into a respective corresponding segment of symbolic text using speech reduction apparatus within said digital camera;

automatically associating each respective digital image of said plurality of digital images with a respective corresponding segment of symbolic text rendered from a respective corresponding segment of human speech based on a temporal relationship between the respective discrete time interval during which the corresponding segment of human speech was recorded and the capturing of the respective digital image, and recording said association in a memory of said digital camera;

uploading said at least one digital image and said at least one segment of symbolic text to a digital image formatting apparatus; and formatting said plurality of digital images and said plurality of segments of symbolic text for viewing by a user using said digital image formatting apparatus, wherein each said segment of symbolic text is formatted for viewing in a human readable form associated with its corresponding digital image;

wherein said step of automatically associating each respective digital image of said plurality of digital images with a respective corresponding segment of symbolic text comprises automatically associating according to all of the following association priorities:

(1) if a first digital image is captured during the recording of a human speech segment corresponding to the symbolic text segment, the symbolic text segment is associated with the first digital image;

(2) if no digital image is captured from a time the digital camera is powered on until the end of the recoding of the human speech segment corresponding to the symbolic text segment, and a second digital image is captured after recording the human speech segment but before the digital camera is powered off, then the symbolic text segment is associated with the second digital image; and (3) in all other cases, the symbolic text is associated with the digital image most recently captured before the recording of the human speech segment corresponding to the symbolic text segment.

12. The method of recording information with digital images of claim 11, wherein said step of rendering each said segment of said plurality of discrete segments of human speech in a respective corresponding segment of symbolic text converts said human speech to an intermediate symbolic form comprising a symbolic representation of phonemes, and wherein said step of formatting said plurality of digital images and said plurality of segments of symbolic text for viewing comprises reducing said intermediate symbolic form to natural language text.

13. The method of recording information with digital images of claim 11, wherein said digital image formatting apparatus is a general-purpose digital computer executing a digital image formatting program.

14. The method of recording information with digital images of claim 11, wherein said step of formatting said plurality of digital images and said plurality of segments of symbolic text comprises formatting for output on paper, wherein formatted text is printed on paper with a corresponding digital image.

15. The method of recording information with digital images of claim 11, wherein said step of formatting said plurality of digital images and said plurality of segments of symbolic text comprises formatting for viewing from an output screen of a digital device, wherein formatted text is displayed on said output screen with a corresponding digital image.

* * * * *